(12) United States Patent
Matsuki et al.

(10) Patent No.: US 6,516,669 B2
(45) Date of Patent: Feb. 11, 2003

(54) VIBRATION-TYPE CONTACT DETECTION SENSOR

(75) Inventors: Kaoru Matsuki, Ibaraki (JP); Kazuhiko Hidaka, Ibaraki (JP); Masanori Arai, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/855,986

(22) Filed: May 15, 2001

(65) Prior Publication Data

US 2002/0005062 A1 Jan. 17, 2002

(30) Foreign Application Priority Data

May 15, 2000 (JP) ........................................ 2000-141469

(51) Int. Cl.[7] .............................................. G01B 5/016
(52) U.S. Cl. ...................... 73/651; 73/104; 73/866.5; 33/503; 33/504; 33/551; 33/556; 33/558; 33/559; 33/572
(58) Field of Search ........................ 73/651, 104, 105, 73/866.5; 33/503, 504, 560, 561, 551, 556, 557, 558, 559, 572

(56) References Cited

U.S. PATENT DOCUMENTS 4,397,188 A * 8/1983 Bansevichus et al. ......... 33/561
5,634,280 A * 6/1997 Hellier et al. .................. 33/556
5,822,877 A * 10/1998 Dai ............................... 33/557
6,198,298 B1 * 3/2001 Nishioki ..................... 324/158.1

FOREIGN PATENT DOCUMENTS

| EP | 0 927 867 A2 | * | 7/1999 | ........... G01B/5/012 |
| GB | 2 006 435 A | | 5/1979 | |
| JP | 9-113251 A | * | 5/1997 | ........... G01B/21/00 |
| JP | 2000-055607 A | * | 2/2000 | ........... G01B/7/00 |
| JP | 2000-055643 | | 2/2000 | |
| JP | 2001-091206 A | * | 4/2001 | ........... G01B/7/00 |

* cited by examiner

*Primary Examiner*—Hezron Williams
*Assistant Examiner*—Rose M. Miller
(74) *Attorney, Agent, or Firm*—Rankin, Hill, Porter & Clark LLP

(57) ABSTRACT

A stylus 20 is mounted directly on detector 32 and the detector 32 is mounted directly on a holder 10. Thus, an vibration-type contact detection sensor 1 is formed in a state in which the holder 10 and the stylus 20 are placed out of contact with each other and the stylus 20 and the detector 32 are placed in contact with each other. Therefore, attenuation of vibration and status change of the stylus 20 by the holder 10 can be circumvented and vibration and status change of the stylus 20 can be propagated directly to the detector 32, so that the detector 32 can detect vibration and status change of the stylus 20 with high sensitivity, and contact with a workpiece can be detected with high sensitivity.

17 Claims, 9 Drawing Sheets

VIBRATION-TYPE CONTACT DETECTION SENSOR

BACKGROUND OF THE INVENTION

1. Field of the Invention

This invention relates to a vibration-type contact detection sensor and more particularly to a vibration-type contact detection sensor used to measure the configuration of a workpiece, etc., with a three-dimensional measuring machine, etc., for example.

2. Description of the Related Art

Hitherto, a height gauge (one-dimensional measuring machine), a three-dimensional measuring machine, a surface property measuring machine, a small-hole measuring machine, etc., has been known as a measuring machine for measuring the configuration and the dimension of a workpiece. Various probes are used for the measuring machines in order to detect the positional relation between the main unit of measuring machine and the workpiece. The probes are classified into non-contact probes and contact probes, and continuously measuring probes (or scanning probes) and trigger transmission probes (or touch probes), etc.

A vibration-type contact detection sensor 100 as shown in FIG. 10 is known as a contact-type trigger transmission probe of a measuring machine as described above (refer to Japanese Patent Unexamined Publication No. 2000-55643). The vibration-type contact detection sensor 100 comprises a stylus holder 101, a stylus 102, and two piezoelectric elements 103.

The stylus holder 101 comprises a fix part 111 and a stylus support portion 112. The fix part 111 is attached to a move shaft of a measuring machine (not shown). The stylus support portion 112 bonds and fixes the stylus 102 therein. The stylus support portion 112 is bifurcated and the stylus 102 is supported along an axial direction at two points of the bifurcate tips. Each tip of the stylus support portion 112 is angular U-shaped in cross section and the stylus 102 is positioned in the opening of the tips of the stylus support portion 112.

The stylus 102 is formed of a substantially column-shaped and is provided at a tip with a contact portion 121 for coming in contact with a workpiece.

The piezoelectric elements 103 vibrates the stylus 102 so that the stylus 102 is vibrated in the axial direction, and detects a change in the vibration state of the stylus 102 occurring when the contact portion 121 comes in contact with a workpiece. One piezoelectric element 103 is attached to the upper face and the other is attached to the lower face of the stylus support portion 112 across the bifurcate parts thereof. If the vibration conditions of the piezoelectric element 103 are adjusted so that the vibration of the stylus achieves resonance, the contact of the stylus with the workpiece can be detected with a high sensitivity.

Common electrodes are respectively formed on the lower face of the piezoelectric element 103 placed on the upper side and the upper face of the piezoelectric element 103 placed on the lower side in FIG. 10. The upper face of the piezoelectric element 103 placed on the upper side in the figure is divided into two parts, a vibrator (more particularly, electrode parts of the vibrator) 131 and a detector 132 (more particularly, electrode parts of the detector) at the position corresponding to the center between the two support points of the stylus support portion 112. In other words, the vibrator 131 and the detector 132 are implemented as a single solid-state component. The lower face of the piezoelectric element 103 placed on the lower side in the figure is also divided into two parts.

In such a structure, if the stylus 102 is vibrated by applying an alternating signal from electrodes of the vibrator 131, it vibrates in a resonance state along the axial direction. In this state, if the contact portion 121 comes in contact with a workpiece, a change occurs in the resonance state of the stylus 102. By measuring the change in the resonance state with an external detection circuit (not shown) via lead wire connected to electrodes of the detector 132, the contact between the contact portion 121 and the workpiece can be detected.

In the vibration-type contact detection sensor 100 as described above, the piezoelectric elements 103 are attached to the upper face and the lower face of the stylus support portion 112 with relatively high rigidity of the stylus holder 101 and thus vibration of the stylus 102 and state change thereof are propagated via the stylus holder 101, rather than directly to the detector 132. Therefore, vibration of the stylus 102 and state change thereof are attenuated in the stylus support portion 112 before they are propagated to the detector 132 and, thus, it is feared that the detection sensitivity of the detector 132 may be degraded.

Particularly, if the aspect ratio of the stylus 102 is large or the stylus 102 is formed of a soft material, attenuation of vibration of the stylus 102 in the stylus holder 101 becomes noticeable. Thus, the possibility that the change in the resonance state of the stylus 102 cannot be detected also occurs depending on the configuration or materials of the stylus 102.

Further, if the stylus 102 comes in contact with the workpiece from a direction orthogonal with the axial direction of the stylus, the stylus 102 is bent and the damage of the stylus 102 can be prevented. However, if the stylus 102 approaches and then comes in contact with the workpiece in the axial direction of the stylus, a relative movement of the stylus and the workpiece cannot be stopped instantaneously and, thus, the overrun occurs in the relative movement. In this case, excess stress is applied to the stylus 102 in the axial direction thereof due to the overrun and it is feared that the stylus 102 may sustain damage, such as plastic deformation or breakage; this is problem.

To circumvent such a problem, it is considered that limitations are imposed on the aspect ratio, the material, etc., of the stylus 102. However, for example, if the vibration-type contact detection sensor 100 is used with a small-hole measuring machine, a stylus with a large aspect ratio is required for measuring a small hole with a large aspect ratio, namely, the object to be measured varies depending on the measuring machine using the vibration-type contact detection sensor 100 and, thus, the configuration and the material of the demanded stylus also varies. For this reason, if limitations are imposed on the configuration, the material, etc., of the stylus 102, the number of types of measuring machines that can use the vibration-type contact detection sensor 100 and the number of types of objects to be measured are decreased; this is a problem.

Further, to circumvent the damage of the stylus by the contact of the stylus 102 with the workpiece in the axial direction of the stylus, a stylus axial direction escape mechanism is provided to prevent the stylus sustaining the damage. However, measurement accuracy is difficult to maintain due to the complicated structure and the cost of the whole sensor increases drastically.

SUMMARY OF THE INVENTION

It is an object of the invention to provide a vibration-type contact detection sensor that can detect contact with a workpiece with high sensitivity without limiting the configuration, material, etc., of a stylus.

To the end, according to a first aspect of the invention, there is provided a vibration-type contact detection sensor comprising a column-shaped stylus provided with a contact portion to be contacted with a workpiece at a tip end thereof; a vibrator for vibrating the stylus in an axial direction of the stylus; a detector for detecting contact of the contact portion with the workpiece based upon a change in vibration state of the stylus occurring when the contact portion and the workpiece come in contact with each other; a holder provided with a support portion for supporting the stylus, the vibrator, and the detector with the support portion, wherein at least the vibrator of the vibrator and the detector is fixed on the support portion of the holder and at least the detector of the vibrator and the detector is fixed to the stylus, and wherein the support portion of the holder and the stylus are disposed to be out of contact with each other.

In the above-mentioned sensor, it is preferable that the vibrator is adjusted so that the vibration of the stylus is at a resonance state.

According to the invention, the stylus is vibrated in a resonance state by the vibrator and the change in the resonance state of the stylus occurring when the contact portion and the workpiece come in contact with each other is detected by the detector, whereby the contact between the stylus and the workpiece can be detected.

The stylus is mounted directly on the detector and the detector is mounted directly on the holder, for example, whereby the vibration-type contact detection sensor is formed in a state in which the holder and the stylus are placed out of contact with each other and the stylus and the detector are placed in contact with each other.

Since the holder and the stylus are placed out of contact with each other, attenuation of vibration and state change (vibration change) of the stylus by the holder can be circumvented and the detector can detect vibration and state change of the stylus with high sensitivity. Therefore, the resonance state change of the stylus occurring when the contact portion of the stylus comes in contact with a workpiece can be detected with high sensitivity, so that contact with the workpiece can be detected with high sensitivity.

Vibration and state change of the stylus is not attenuated by the holder. Thus, if a stylus whose vibration attenuation is noticeable, a stylus with a high aspect ratio, a stylus formed of a soft material, or any other stylus is used with the vibration-type contact detection sensor, vibration and state change of the stylus can be detected reliably. Therefore, styluses of various configurations and materials are used matching the types of measuring machines and objects to be measured, so that the application range of the vibration-type contact detection sensor of the invention can be widened.

On the other hand, since the stylus and the detector are in contact with each other, vibration and state change of the stylus are propagated directly to the detector. Accordingly, if vibration change of the stylus occurring when the stylus comes in contact with a workpiece is slight, it can be detected by the detector reliably. Therefore, degradation of the detection sensitivity because of the configuration of the contact portion of the stylus can be prevented.

According to a second aspect of the invention, there is provided a vibration-type contact detection sensor comprising: a column-shaped stylus provided with a contact portion to be contact with a workpiece at a tip end thereof; a vibrator for vibrating the stylus in an axial direction of the stylus; a detector for detecting a contact of the contact portion with the workpiece from a change in vibration state of the stylus occurring when the contact portion and the workpiece come in contact with each other; a holder provided with a support portion, for supporting the stylus, the vibrator and the detector with the support portion, wherein at least the vibrator of the vibrator and the detector is fixed on the support portion of the holder and at least the detector of the vibrator and the detector is fixed to the stylus, and wherein the support portion of the holder and the stylus are disposed to be out of contact with each other. The support portion of the holder comprises a plurality of plate springs disposed substantially orthogonal with the stylus and parallel to each other and the plate spring is formed so that the stylus can be displaced in the axial direction thereof due to a slightly force.

According to the invention, the stylus is supported for displacement in the axial direction thereof. Therefore, if the contact portion of the stylus comes in contact with the workpiece in the axial direction of the stylus and the overrun occurs in the relative movement of the stylus and the workpiece, the stylus cannot be greatly deformed by the operation of the plate spring, and the whole stylus can be displaced in the axial direction of the stylus, whereby the damage of the stylus can be prevented.

BRIEF DESCRIPTION OF THE DRAWINGS

These and further features of the invention will be apparent with reference to the following description and drawings, wherein.

DETAILED DESCRIPTION OF THE INVENTION

Referring now to the accompanying drawings, there are shown preferred embodiments of the invention.

Figure 1:
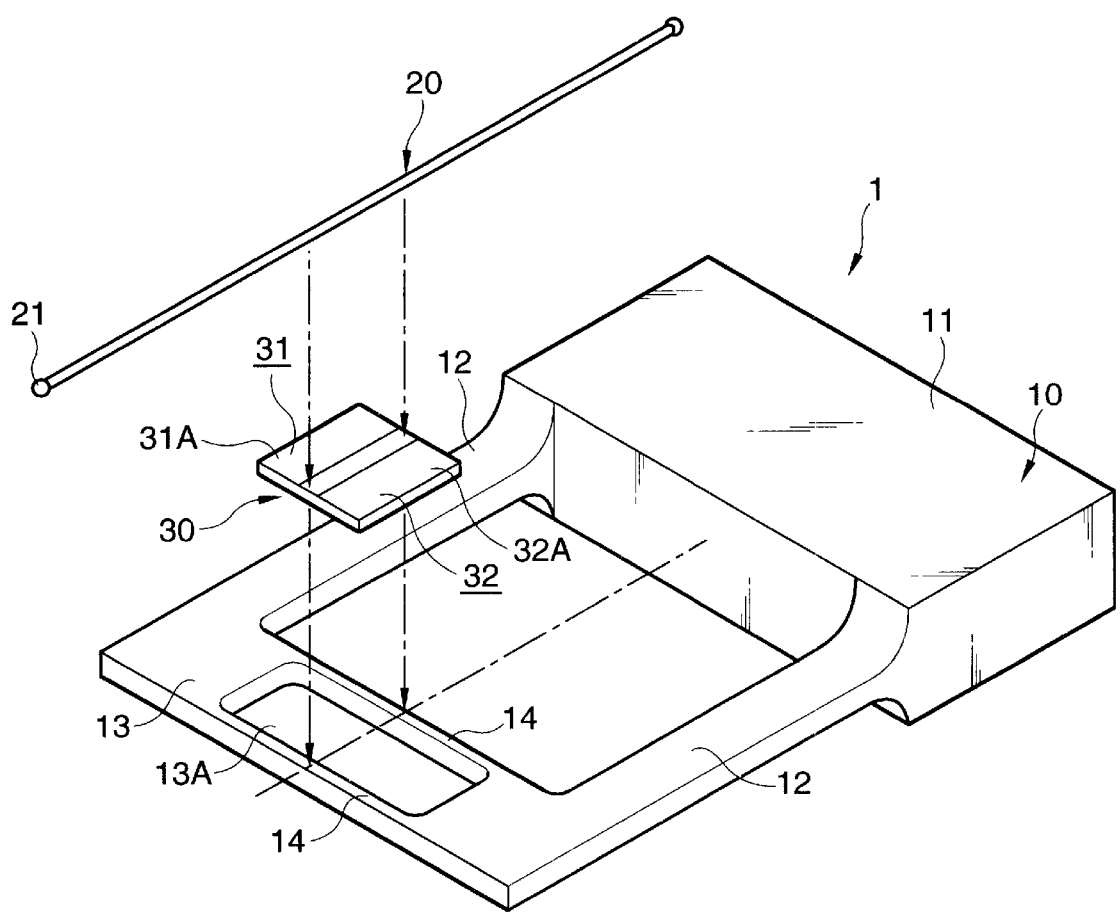
FIG. 1 is an exploded perspective view of a vibration-type contact detection sensor according to a first embodiment of the invention.

FIG. 1 shows a vibration-type contact detection sensor 1 according to a first embodiment of the invention. The vibration-type contact detection sensor 1 comprises a holder 10 formed of beryllium copper, a stylus 20, and a piezo-electric element 30 as a solid-state component.

The holder 10 comprises a fix part 11, a pair of arm parts 12, and a joint part 13. The fix part 11 is attached to a Z-axial movement mechanism of a three-dimensional measuring machine, etc., (not shown). The pair of arm parts 12 extend in parallel from the fix part 11. The joint part 13 is substantially orthogonal with the arm parts 12 for joining the tips of the pair of arm parts 12. On a center portion of the joint part 13, a rectangular opening part 13A is formed, whereby a pair of parallel plate spring parts (parallel piezoelectric element support parts) 14, which are shaped like narrow plates, are formed along the opening part 13A of the joint part 13. The parallel plate spring parts 14 are orthogonal with the arm parts 12 (namely, the parallel plate spring parts 14 are orthogonal with the axial direction of the stylus), and both end portions of the parallel spring parts 14 are supported by the pair of arms 12. Young's modulus of the material of the plate spring part 14 is preferably less than $11000 N/mm^2$.

The stylus 20 is formed substantially like a column and is provided at a tip with a spherical contact portion 21 for coming in contact with a workpiece and at a rear end with a counter balance (not shown) as required. The portion where the stylus 20 is fixed to the piezoelectric element 30 coincides with the center of mass distribution of stylus 20 including the counter balance or neighbor portion thereof.

The piezoelectric element 30 shaped like rectangular plate vibrates the stylus 20 in a resonance state in the axial direction and detects a change in the resonance state of the stylus 20 occurring when the contact portion 21 comes in contact with a workpiece.

The piezoelectric element 30 is fixed (mounted) on the parallel plate spring parts 14 by bonding, soldering, etc., such that it straddles the pair of parallel plate spring parts( piezoelectric element support parts) 14. A common electrode (not shown) is formed on the mount face of the piezoelectric element 30 on the parallel plate spring parts 14 (lower face in the figure) and the opposite face to the mount face (upper face in the figure) is divided at the center into two electrodes 31A and 32A.

Vibrator 31 for vibrating the stylus 20 in a resonance state in the axial direction is provided by forming the piezoelectric element 30 with a vibration electrode 31A and providing the vibration electrode 31A with a lead (not shown) for applying a voltage at a predetermined frequency to the vibration electrode 31A. On the other hand, detector 32 for detecting a change in the resonance state of the stylus 20 occurring when the contact portion 21 comes in contact with a workpiece is provided by forming the piezoelectric element 30 with a detection electrode 32A and providing the detection electrode 32A with a lead (not shown) for transmitting a detection signal.

Between the two electrodes 31A and 32A formed on the top face of the piezoelectric element 30 a strip shaped area indicating the electrical insulating characteristics is formed, and the stylus 20 is fixed to the strip shaped area by bonding, soldering, etc. Thus, the vibration-type contact detection sensor 1 is formed with the parallel plate spring parts 14 and the stylus 20 out of contact with each other. That is, the holder 10 and the stylus 20 are out of contact with each other, and the stylus 20 and the piezoelectric element 30 are in contact with each other.

The centroid position of the stylus 20 is on the substantially center of the piezoelectric element 30.

If the voltage at the predetermined frequency is applied to the vibration electrode 31A, the stylus 20 vibrates in a resonance state in the axial direction by the vibrator 31. The vibration of the stylus 20 is propagated directly to the piezoelectric element 30, which then also vibrates at the same frequency as the stylus 20. The vibration state can be detected by observing a detection signal from the detection electrode 32A. This means that the vibration state of the stylus 20 can be detected by the detector 32. Since the stylus 20 is mounted directly on the piezoelectric element 30, the vibration of the stylus 20 is propagated directly to the piezoelectric element 30, namely, the detector 32.

The described vibration-type contact detection sensor 1 is used as a contact trigger transmission probe of a three-dimensional measuring machine, etc.

Specifically, the stylus 20 vibrates in a resonance state along the axial direction by the vibrator 31. In this state, if a workpiece and the vibration-type contact detection sensor 1 are moved relatively and the contact portion 21 comes in contact with the workpiece, the vibration of the stylus 20 is constrained and change occurs in the resonance state (vibration) of the stylus 20. This change in the resonance state is detected by the detector 32, so that contact between the stylus 20 and the workpiece can be detected.

If the vibration-type contact detection sensor 1 is attached to a Z-axial slider of the three-dimensional measuring machine, etc., and the stylus 20 is moved in the axis thereof, coordinates in the Z-axial direction can be measured by allowing the stylus 20 to contact perpendicular to the workpiece. In this case, the Z-axial slider needs to be stopped instantaneously when the contact portion 21 of the stylus 20 comes in contact with the workpiece. However, in deed, the Z-axial slider has a constant inertia and there is a delay in the control of the slider. Thus, the Z-axial slider is difficult to be stopped instantly when the contact portion comes in contact with the workpiece unless the stylus 20 is moved at very slow speed. If the stylus 20 comes in contact with the workpiece at a few mm per sec, for example, the overrun of a few $\mu m$ occurs. In this time, the stylus 20 is pushed into the workpiece by the amount of the overrun, thus causing damage, such as plastic deformation or breakage, depending on the materials of the stylus. According to the invention, the force added to the stylus is subjected to the parallel plate spring part 14, and the extra force is absorbed as the parallel plate springs are bent and deformed. As a result, even if the overrun occurs, damage, such as plastic deformation or breakage of the stylus 20, can be prevented.

According to the described embodiment, the following advantages are provided:

The stylus 20 is mounted directly on the detector 32 and at least the vibrator 31 of the vibrator 31 and the detector 32 of the piezoelectric element 30 is mounted on the parallel plate spring part 14 of the holder 10, whereby the vibration-type contact detection sensor 1 is formed with the holder 10 and the stylus 20 out of contact with each other. In the embodiment, both the vibrator 31 and the detector 32 of the piezoelectric element 30 are mounted on the parallel plate spring part 14 of the holder 10.

Since the parallel plate spring part 14 of the holder 10 and the stylus 20 are out of contact with each other, attenuation of vibration and state change (vibration change) of the stylus 20 by the holder 10 can be avoided and the detector 32 can detect vibration and resonant state change of the stylus 20 with high sensitivity. Therefore, state change of the stylus 20 occurring when the contact portion 21 of the stylus 20 comes in contact with a workpiece can be detected with high sensitivity, so that contact with the workpiece can be detected with high sensitivity.

(2) A ratio that vibration and state change of the stylus 20 is attenuated by the parallel plate spring part 14 of the holder 10 is low. Thus, if a stylus whose vibration attenuation is noticeable, a stylus with a high aspect ratio, a stylus formed of a soft material, or any other stylus is used with the vibration-type contact detection sensor 1, vibration and state change of the stylus can be detected reliably. Therefore, styluses of various configurations and materials are used matching the types of measuring machines and objects to be measured, so that the application range of the vibration-type contact detection sensor 1 can be widened.

(3) Since the stylus 20 and the piezoelectric element 30, namely, the detector 32, are in contact with each other, vibration and state change of the stylus 20 are propagated directly to the detector 32. Accordingly, even if vibration change of the stylus 20 occurring when the stylus 20 comes in contact with a workpiece is slight, it can be detected by the detector 32 reliably. Therefore, degradation of the detection sensitivity because of the configuration of the contact portion 21 of the stylus 20 can be prevented.

(4) The vibrator 31 and the detector 32 are implemented as one piezoelectric element 30 divided into two parts. Thus, if at least one piezoelectric element 30 is provided, the vibration-type contact detection sensor 1 can be provided with the vibrator 31 and the detector 32 and can be formed at low costs and with small size.

(5) The detector is supported by the parallel plate spring parts 14. If the stylus is pushed into the workpiece, the force added to the stylus is subjected to the parallel plate spring parts 14, then the parallel plate spring parts 14 are deformed. Thus, unreasonable force on the stylus 20 can be prevented. As a result, even if the overrun occurs, damage, such as plastic deformation or breakage of the stylus 20, can be prevented.

Figure 2:
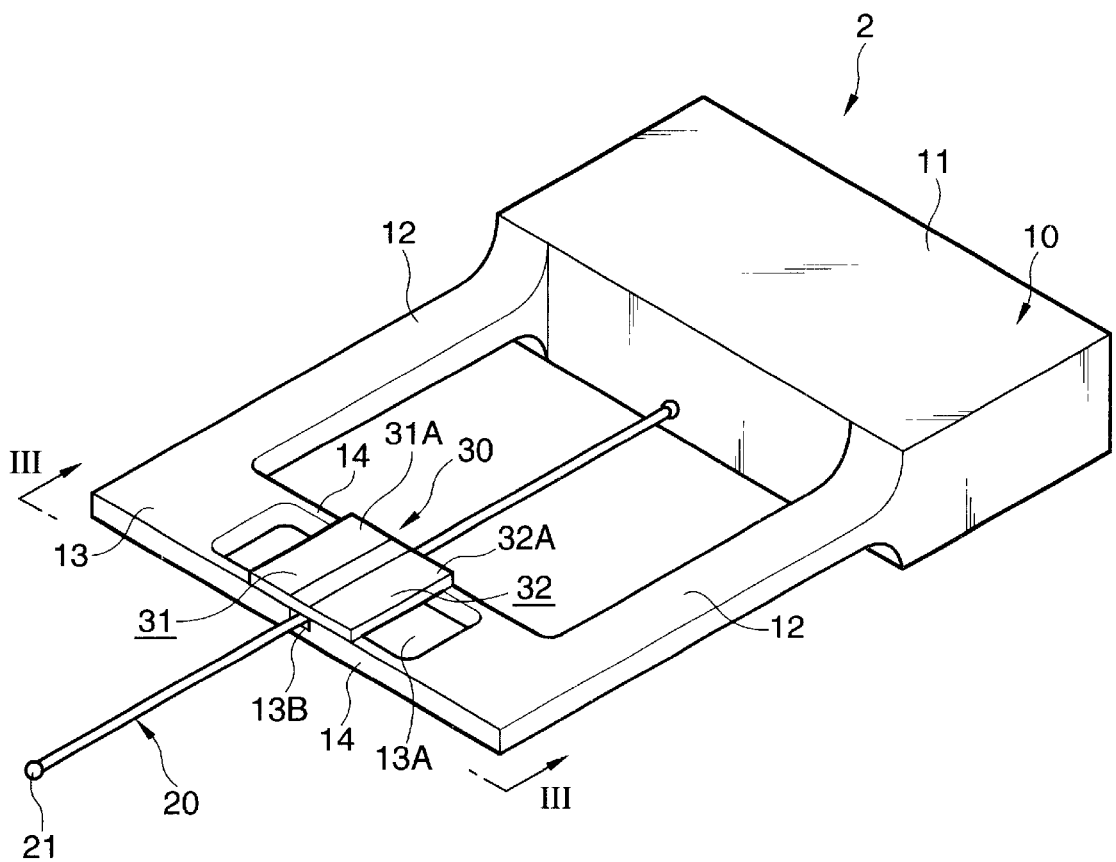
FIG. 2 is a general perspective view of a vibration-type contact detection sensor according to a second embodiment of the invention.
Figure 3:
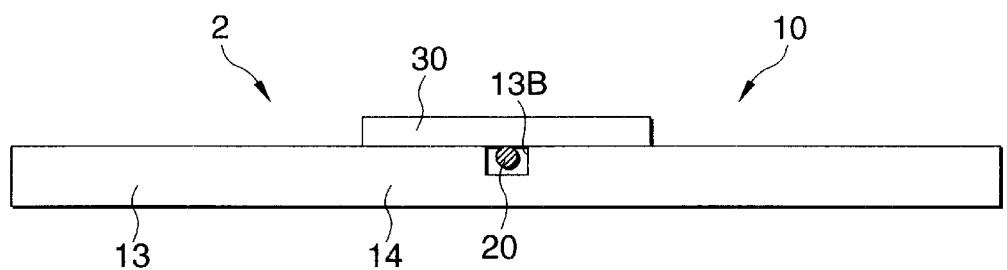
FIG. 3 is a sectional view taken on line III—III in FIG. 2.

FIGS. 2 and 3 show a vibration-type contact detection sensor 2 according to a second embodiment of the invention. The second embodiment and the first embodiment described above differ only in mount position of stylus on piezoelectric element and are the same in other components and functions and therefore parts identical with those previously described with reference to FIG. 1 are denoted by the same reference numerals in FIGS. 2 and 3 and will not be discussed again in detail.

A stylus 20 is fixed on a mount face of a piezoelectric element 30 on parallel plate spring parts 14. The pair of parallel plate spring parts 14 of the holder 10 is formed with notch parts or grooves 13B extending in an axial direction of the stylus 20. The piezoelectric element 30 is mounted on the parallel plate spring parts 14 straddling the notch parts (grooves) 13B and the stylus 20 is placed in spaces formed by the piezoelectric element 30 and the notch parts 13B, also shown in FIG. 3. The holder 10 and the stylus 20 are placed out of contact with each other and the stylus 20 and the piezoelectric element 30, namely, detector 32 are placed in contact with each other.

According to the described embodiment, the following advantages, in addition to the advantages (1) to (5) of the first embodiment described above, are provided:

(6) The parallel plate spring parts 14 of the holder 10 is formed with the notch parts 13B along the axial direction of the stylus 20, at least vibrator 31 of the vibrator 31 and detector 32 of the piezoelectric element 30 straddles the notch parts 13B, and the stylus 20 is fixed on at least the detector 32 of the vibrator 31 and detector 32 and is placed in the spaces formed by the notch parts 13B and the vibrator 31.

Specifically, in the illustrated embodiment, the piezoelectric element 30 is placed straddling the notch parts 13B while the stylus 20 is fixed on the vibrator 31 and the detector 32 and is placed in the spaces formed by the notch parts 13B and the piezoelectric element 30. Therefore, if the stylus 20 is sandwiched between the parallel plate spring parts 14 of the holder 10 and the vibrator 31 (piezoelectric element 30) in the vibration-type contact detection sensor 2, the holder 10 and the stylus 20 can be placed out of contact with each other.

Figure 4:
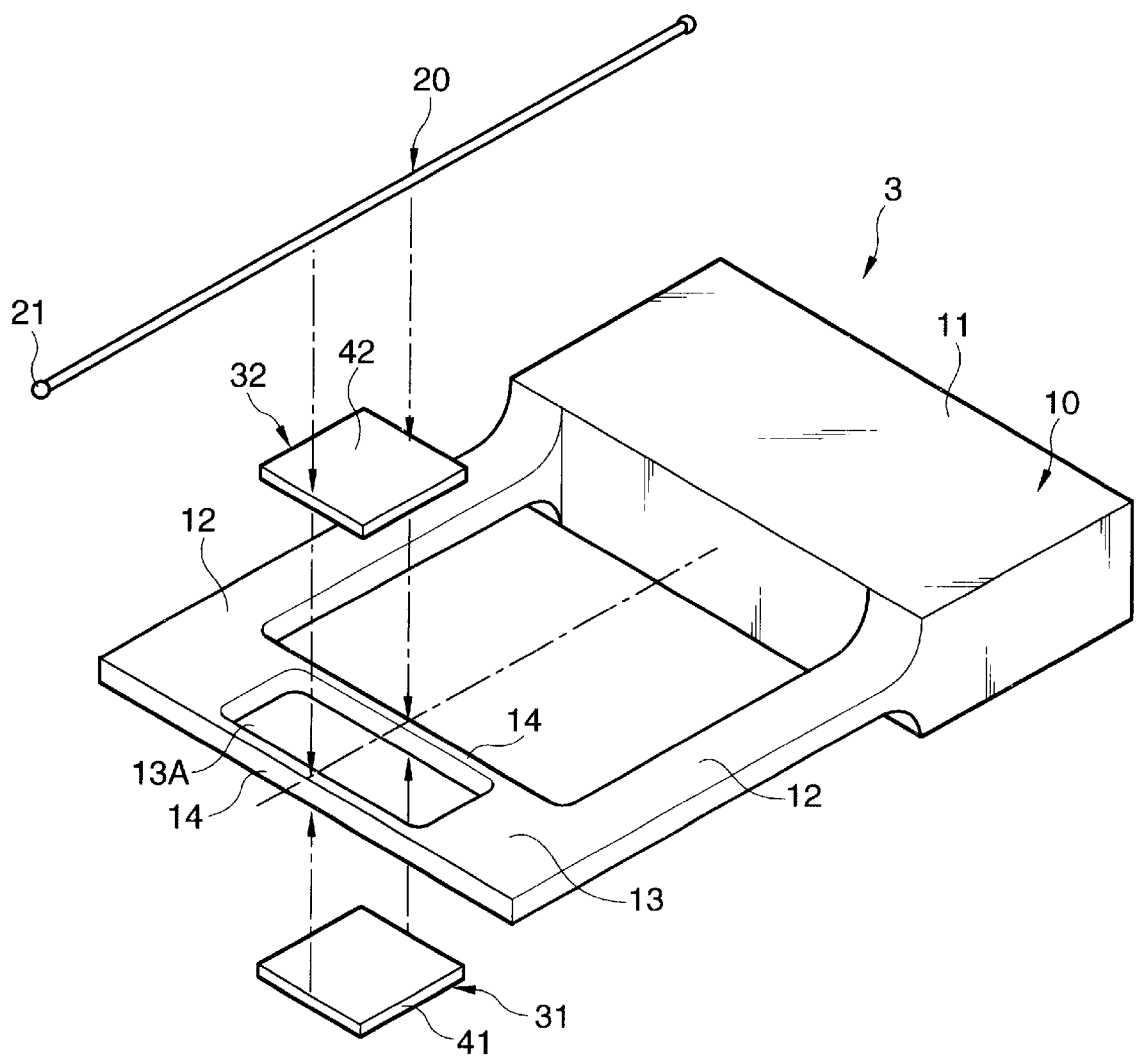
FIG. 4 is an exploded perspective view of a vibration-type contact detection sensor according to a third embodiment of the invention.

FIG. 4 shows a vibration-type contact detection sensor 3 according to a third embodiment of the invention. The third embodiment differs from the first embodiment described above only in that vibrator and detector are implemented as separate piezoelectric elements; the embodiments are the same in other components and functions and therefore parts identical with those previously described with reference to FIG. 1 are denoted by the same reference numerals in FIG. 4 and will not be discussed again in detail.

The vibration-type contact detection sensor 3 comprises a vibration piezoelectric element 41 forming vibrator 31 and a detection piezoelectric element 42 forming detector 32. Electrodes are respectively formed on the front and back of the two piezoelectric elements 41 and 42. The piezoelectric elements 41 and 42 are placed facing each other and are mounted on a holder 10 in a state in which they sandwich a pair of piezoelectric element support parts 14 and straddle the piezoelectric element support parts 14. A stylus 20 is mounted on a face opposite to the mount face of the detection piezoelectric element 42 on the parallel plate spring parts (piezoelectric element support parts) 14.

In the configuration, in the vibrator 31, if a voltage at a predetermined frequency is applied to the vibration piezoelectric element 41, the vibration is propagated from the parallel plate spring parts 14 of the holder 10 to the detector 32 and from the detector 32 to the stylus 20 and the stylus 20 vibrates in a resonance state in an axial direction. This means that the vibrator 31 vibrates the stylus 20 indirectly. The vibration of the stylus 20 is propagated directly to the detection piezoelectric element 42, which then also vibrates at the same frequency as the stylus 20. The vibration state can be detected by observing a detection signal from the electrode of the detection piezoelectric element 42. This means that the vibration state of the stylus 20 can be detected by the detector 32.

According to the described embodiment, the following advantage, in addition to the advantages (1) to (3) of the first embodiment described above, is provided:

(7) The vibrator 31 and the detector 32 are implemented as the separate piezoelectric elements 41 and 42 and thus their electrode structures can be simplified.

The invention is not limited to the described embodiments and contains modifications and improvements in the scope in which the object of the invention can be accomplished.

For example, the number of the parallel plate spring parts 14 may be three instead of two as shown in the first embodiment. In this case, in each parallel plate spring part, positions where the piezoelectric element is fixed are preferably three points, i.e., a point at a node of the vibration in the axial direction of the stylus 20 and two points each spaced from the node at an equal interval and sandwiching the node therebetween.

Figure 7A:
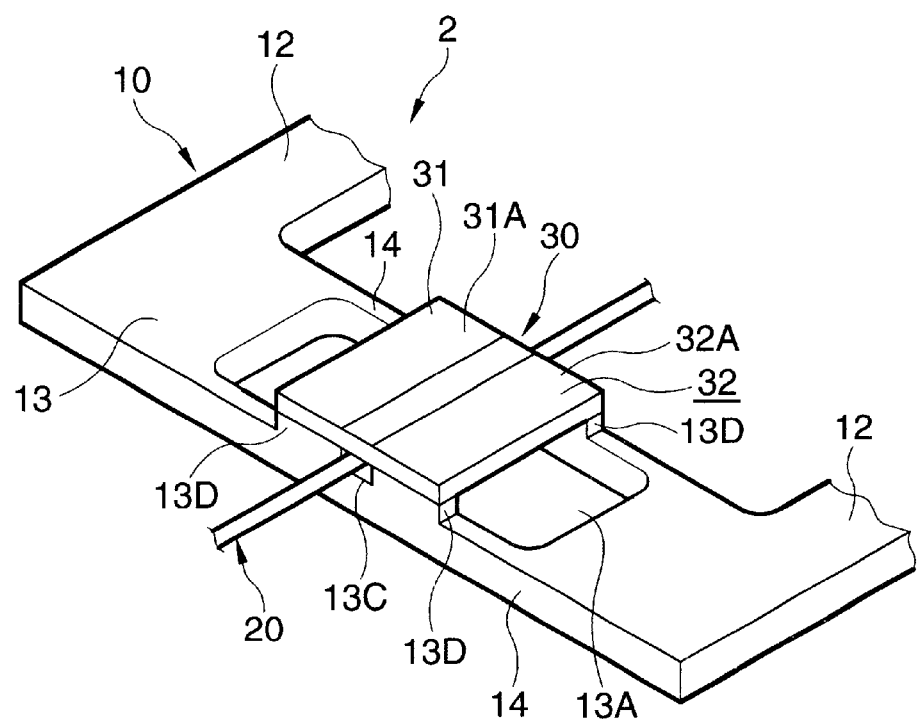
FIGS. 7A and 7B are drawings of still another modified embodiment of the invention.
Figure 7B:
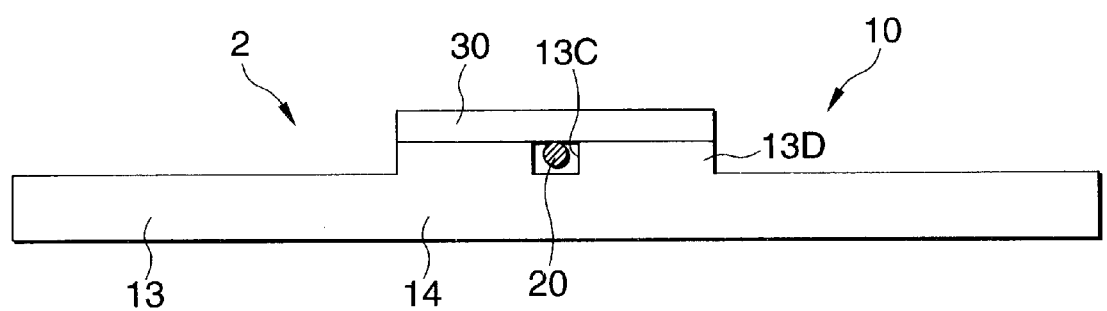

Further, for example, in the second embodiment, the notch parts 13B are formed as notches in the parallel plate spring parts 14 of the holder 10, but may be notch parts 13C as shown in FIGS. 7A–B.

Specifically, as shown in FIG. 7A, each parallel plate spring part 14 is formed with a pair of projections 13D with a predetermined spacing along a longitudinal direction of the parallel plate spring part 14, and each notch part 13C is formed between the projections 13D. The piezoelectric element 30 is placed straddling the four projections 13D formed on the pair of parallel plate spring parts 14 and the stylus 20 is placed in spaces formed by the piezoelectric element 30 and the notch parts 13C. Accordingly, even the notch parts 13C formed by providing the projections 13D enable the parallel plate spring parts 14 and the stylus 20 to be placed out of contact with each other, that is, the holder 10 and the stylus 20 to be placed out of contact with each other, also shown in FIG. 7B.

Figure 9:
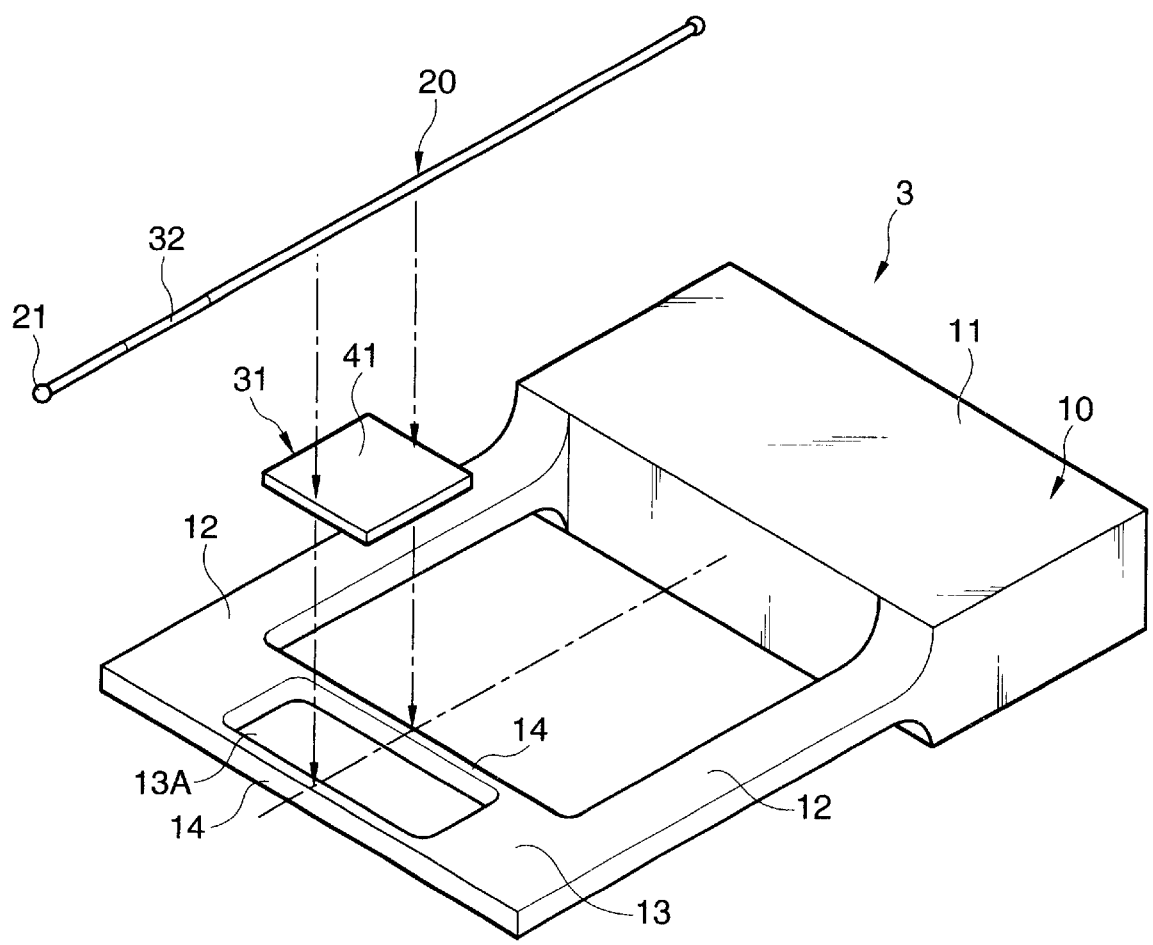
FIG. 9 is an exploded perspective view of a vibration-type contact detection sensor according to another modified embodiment of the invention.
Figure 10:
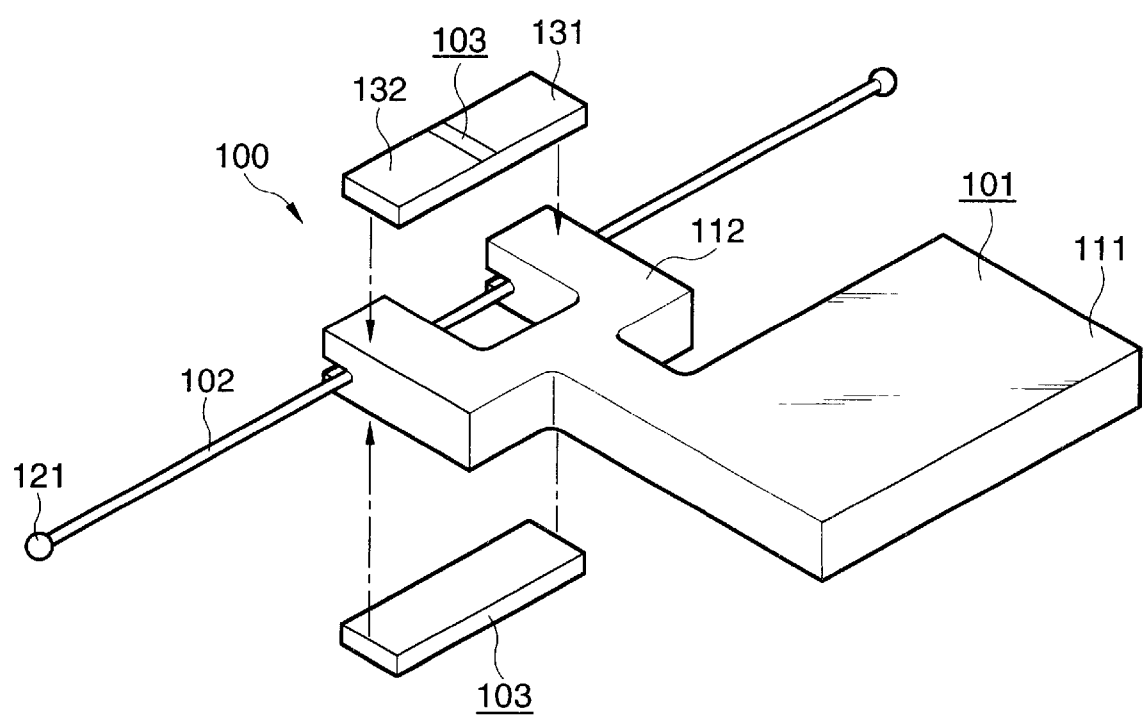
FIG. 10 is a perspective view of an example in a related art.

Further, and with reference to FIG. 9, in the third embodiment as shown in FIG. 4, the detector 32 may be replaced by the vibrator 31 and the detector 32 may be a cylindrical detector disposed along a peripheral or circumferential surface of the stylus instead of the plate-shaped solid-state element. In this case, the detector is preferably disposed between the contact portion 21 of the stylus and the vibrator on the peripheral surface of the stylus.

Figure 5A:
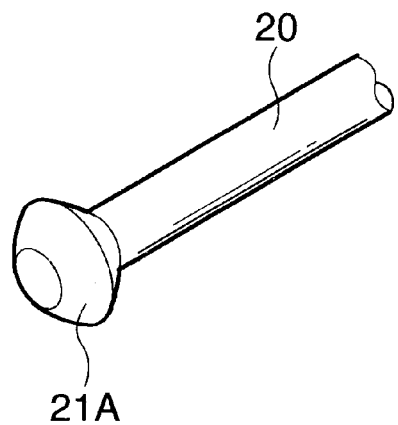
FIGS. 5A to 5C are enlarged perspective views of the a stylus contact portion according to a modified embodiment of the invention.
Figure 5B:
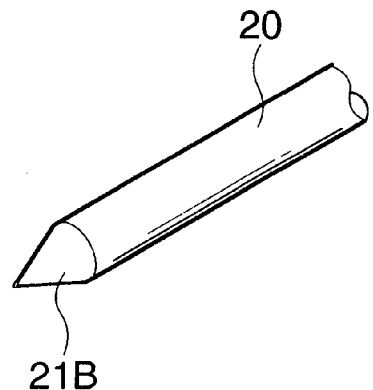
Figure 5C:
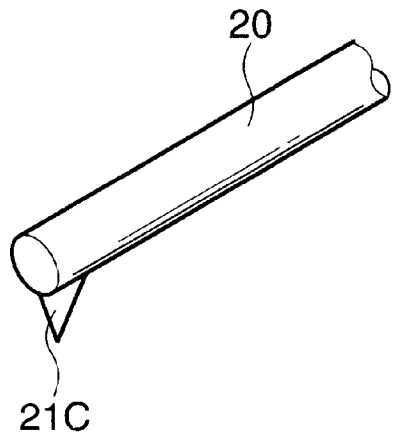

In the described embodiments, the contact portion 21 of the stylus 20 is formed like a sphere, but the contact portion of the invention is not limited thereto. Rather, the configuration of the contact portion may be determined appropriately in response to the object to be measured by a measuring machine using the vibration-type contact detection sensor of the invention. Specifically, for example, to use the vibration-type contact detection sensor with a small-hole measuring machine, the contact portion may be a contact portion 21A shaped like a disc as shown in FIG. 5A; to use the vibration-type contact detection sensor with a surface property measuring machine, the contact portion may be a contact portion 21B like a needle as shown in FIG. 5B or may be a contact portion 21C like a projection extending in a direction substantially orthogonal with the axial direction of the stylus 20, as shown in FIG. 5C.

Thus, the configuration of the contact portion of the stylus is determined appropriately in response to the object to be measured by the measuring machine using the vibration-type contact detection sensor, so that change in vibration of the stylus when the stylus and a workpiece come in contact with each other becomes more noticeable and contact between the stylus and the workpiece can be detected with higher sensitivity.

Figure 6:
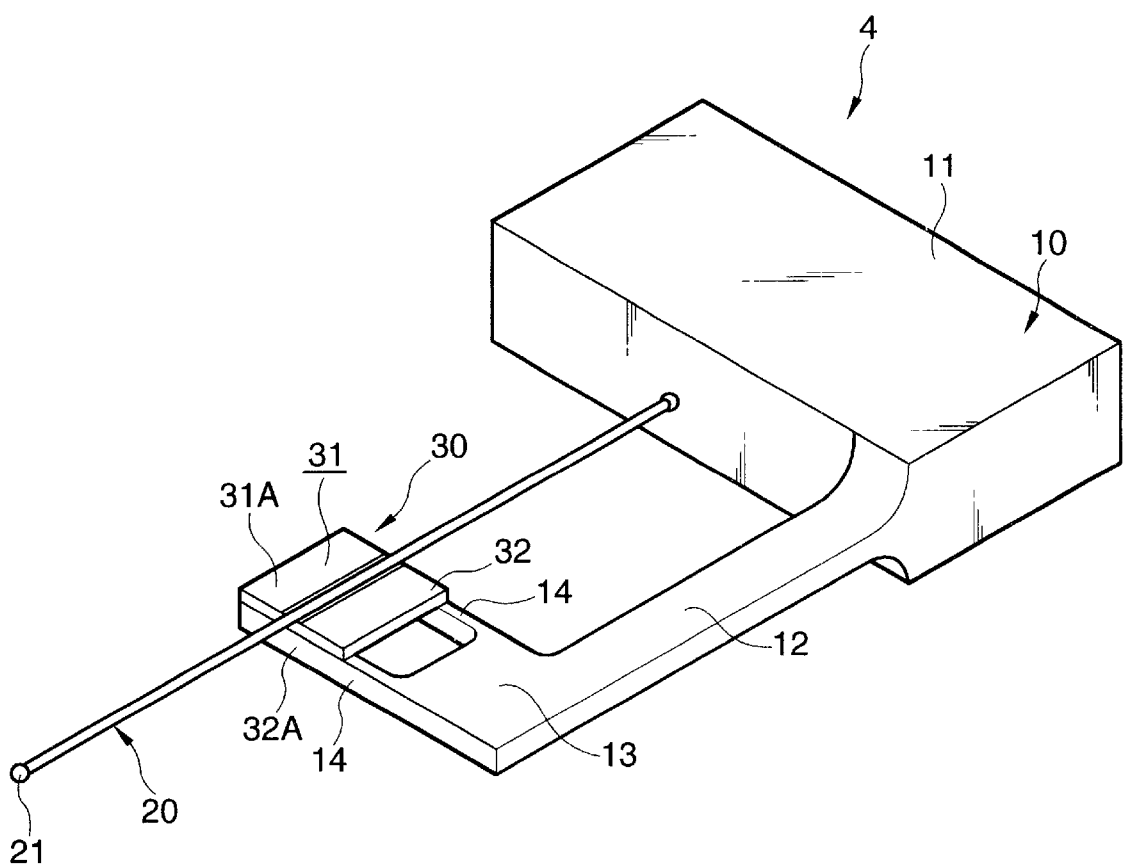
FIG. 6 is a general perspective view of another modified embodiment of the invention.

In the described embodiments, each parallel plate spring part 14 is supported at both ends by the pair of arm parts 12, but the vibration-type contact detection sensor may be a vibration-type contact detection sensor 4 having a structure wherein one arm part 12 supports one end of each piezoelectric element support part 14, for example, as shown in FIG. 6. Further, the number of the parallel plate spring parts 14 may be four or more instead of two or three. In the described embodiments, the piezoelectric elements 30; 41, and 42 are used as solid-state components, but solid-state components of magnetostrictive elements, shape-memory elements, etc., may be adopted.

Figure 8A:
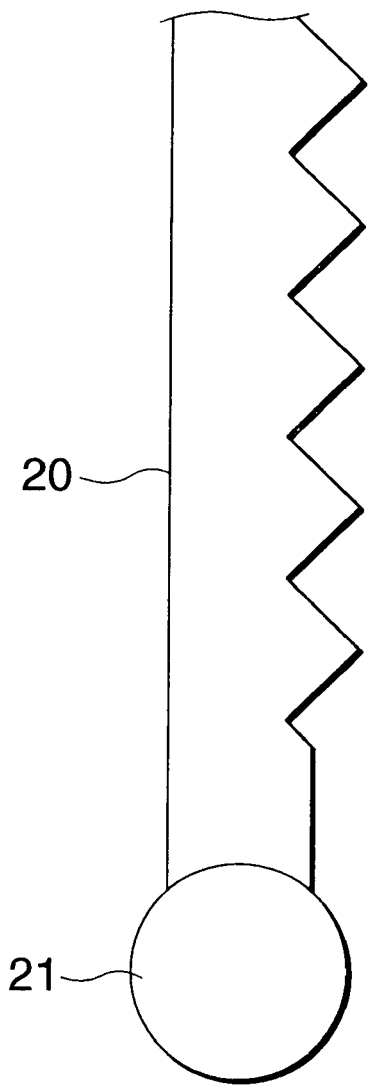
FIGS. 8A and 8B are drawings of the contact portion of the vibration-type contact detection sensor according to the first embodiment of the invention with the workpiece.
Figure 8B:
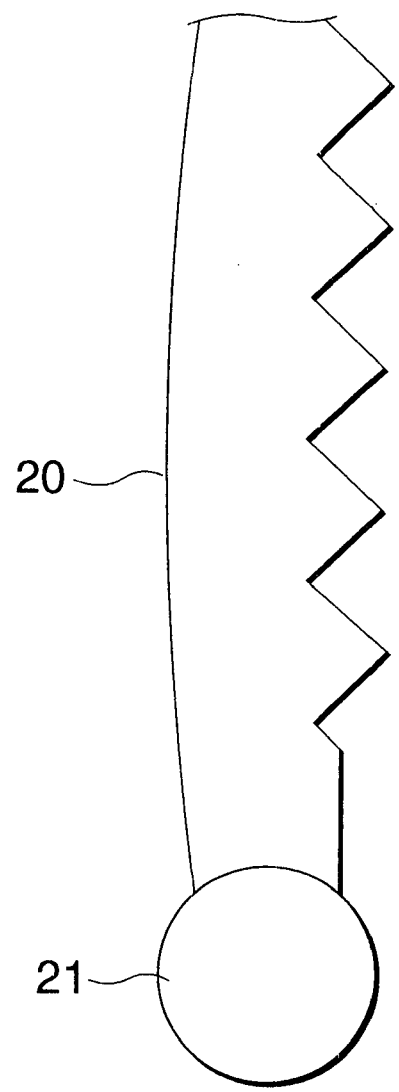

Further, in the described embodiment s, the configuration of the stylus 20 maybe asymmetric with respect to the axis as shown in FIG. 8A, whereby in a plane orthogonal with the axis, axis rigidity of the stylus 20 may have a characteristics such that rigidity in an area at a predetermined angle when the axis is defined as a center is lessened. In this case, if the stylus 20 is subjected to the force in the axial direction, the stylus 20 can be bent in a predetermined angular direction. In other words, if the excessive force is subjected to the stylus 20 in the axial direction due to the overrun, etc., the stylus 20 is bent with the plastic deformation as shown in FIG. 8B. In this case, the stylus is formed such that weight of the stylus in the whole angle directions when the axis is defined as center is constant while in the plane orthogonal with the axis of the stylus 20, the rigidity in the area (in the right direction in FIG. 8B) at the predetermined angle when the axis is defined as center is lessened. Thus, even if the stylus is vibrated in the axial direction, the vibration is uniform and the stylus is vibrated in only the axial direction.

Further, if the vibration-type contact detection sensor is attached to a Z-axial movement mechanism of a three-dimensional measuring machine via the holder 10, the stylus 20 is disposed so that the axial direction of the stylus is slightly tilted with respect to the Z-axis of the Z-axial movement mechanism of the three-dimensional measuring machine. Thus, if the stylus is pushed into the workpiece in the Z-axial direction, as the force subjected to the stylus is slightly tilted with respect to the axis of the stylus, the stylus is easily bent and the influence of overrun can be easily prevented. Therefore, damage, such as plastic deformation or breakage of the stylus, can be prevented.

In the first and second embodiments, the vibrator 31 and the detector 32 (piezoelectric element 30) are mounted on the parallel plate spring parts 14 of the holder 10 and are also mounted on the stylus 20. In the third embodiment, the vibrator 31 (piezoelectric element 41) and the detector 32 (piezoelectric element 42) are mounted on the parallel plate spring parts 14 of the holder 10 and only the detector 32 is mounted on the stylus 20. However, the vibration-type contact detection sensor may be a vibration-type contact detection sensor comprising a vibrator mounted on a holder, a detector mounted on the vibrator, and a stylus mounted on the detector. In short, the vibration-type contact detection sensor may be an vibration-type contact detection sensor wherein at least vibrator of vibrator and detector is mounted on a holder, at least the detector of the vibrator and the detector is mounted on a stylus, and the holder and the stylus are out of contact with each other.

According to the invention, the stylus is mounted directly on the detector, so that contact with a workpiece can be detected with high sensitivity without limiting the configuration, material, etc., of the stylus.

What is claimed is:

1. A contact detection sensor comprising:
    a column-shaped stylus provided with a contact portion to be contacted with a workpiece at a tip end thereof;
    a vibrator for vibrating said stylus in an axial direction of said stylus;
    a detector for detecting a contact of the contact portion with the workpiece from a change in vibration state of said stylus occurring when the contact portion and the workpiece come in contact with each other;
    a holder provided with a support portion for supporting said stylus, said vibrator, and said detector with the support portion,
    wherein at least said vibrator is fixed on the support portion of said holder and at least said detector is fixed to said stylus, the support portion of said holder and said stylus are disposed to be out of contact with each other, and said vibrator vibrates said stylus in a resonance state in the stylus axial direction.

2. The contact detection sensor as claimed in claim 1, wherein axial rigidity of said stylus has a characteristic such that, in a plane orthogonal with the axial direction of said stylus, rigidity in an area at a predetermined angle, when an axis of said stylus is defined as a center, is lessened.

3. The contact detection sensor as claimed in claim 1, wherein said stylus is supported by the support portion of said holder so that when said holder is attached on a Z-axial movement mechanism for a measuring machine, an axis of said stylus is slightly tilted with respect to Z-axis of the Z-axial movement mechanism.

4. The contact detection sensor as claimed in claim 1, wherein the support portion of said holder has a plurality of plate springs disposed substantially orthogonal with said stylus and parallel to each other, said plate springs being deformable in the axis direction of said stylus.

5. The contact detection sensor as claimed in claim 4, wherein both ends of the each plate spring are fixed to said holder.

6. The contact detection sensor as claimed in claim 4, wherein one end of the each plate spring is fixed to said holder.

7. The contact detection sensor as claimed in claim 4, wherein the plate spring is formed of same materials as said holder, and the plate spring and said holder are formed integrally.

8. The contact detection sensor as claimed in claim 4, wherein Young's modulus of the material of the plate spring is less than $110000 N/mm^2$.

9. The contact detection sensor as claimed in claim 4, wherein said vibrator is fixed on the one face of the support portion of said holder and said detector is fixed on the other face of the support portion of said holder.

10. The contact detection sensor as claimed in claim 4, wherein said vibrator is implemented as one solid-state component, opposite edge portions on one face of the solid-state component is attached to the plate spring of said holder and said stylus is fixed on the other face of the solid-state component, and wherein said detector is disposed between said contact portion of said stylus and a fixed portion of said stylus and said vibrator on peripheral face of said stylus.

11. A contact detection sensor comprising:
    a column-shaped stylus provided with a contact portion to be contact with a workpiece at a tip end thereof;
    a vibrator for vibrating said stylus in an axial direction of said stylus, said vibrator including a vibration electrode for inputting a vibration signal;
    a detector for detecting a contact of the contact portion with the workpiece from a change in vibration state of said stylus occurring when the contact portion and the workpiece come in contact with each other, said detector including a detection electrode for outputting a detection signal;
    a holder provided with a support portion, for supporting said stylus, said vibrator and said detector with the support portion,
    wherein said vibrator and said detector are implemented as one solid-state component, the vibration electrode and the detection electrode are formed on one face of the solid-state component so that they sandwich a strip-shaped electrical insulation area, a ground electrode is formed on the other face of the solid-state component, wherein said stylus is fixed to the electrical insulation area, and wherein the support portion of said holder is fixed to the other face of the solid-state component.

12. The contact detection sensor as claimed in claim 11, wherein the support portion of said holder having a plurality of plate springs disposed substantially orthogonal with said stylus and parallel to each other, said plate springs being deformable in the axis direction of said stylus, and opposite edge portions on the other face of said solid-state component are fixed to the plate springs.

13. The contact detection sensor as claimed in claim 11, wherein the solid-state component includes a solid-state component, a magnetostrictive element, or a configuration-memory element.

14. A contact detection sensor comprising:
    a column-shaped stylus provided with a contact portion to be contact with a workpiece at a tip end thereof;
    a vibrator for vibrating said stylus in an axial direction of said stylus, said vibration including a vibration electrode for inputting a vibration signal a;
    a detector for detecting a contact of the contact portion with the workpiece from a change in vibration state of said stylus occurring when the contact portion and the workpiece come in contact with each other, said detector including a detection electrode for outputting a detection signal;
    a holder provided with a support portion, for supporting said stylus, said vibrator and said detector with the support portion,
    wherein said vibrator and said detector are implemented as one solid-state component, the vibration electrode and the detection electrode are formed on one face of the solid-state component so that they sandwich a strip-shaped electrical insulation area and a ground electrode is formed on the other face of the solid-state component, and wherein said stylus is fixed to the other face of the solid-state component corresponding to the electrical insulation area, and wherein the support portion of said holder is fixed to the other face of the solid-state component and is formed with a notch part for preventing said stylus being in contact with the support portion of said holder.

15. The contact detection sensor as claimed in claim 14, wherein the support portion of said holder has a plurality of plate springs disposed substantially orthogonal with said stylus and parallel to each other, said plate springs being deformable in the axis direction of said stylus, and opposite edge portions on the other face of said solid-state component are fixed to the plate springs.

16. The contact detection sensor as claimed in claim 14, wherein the solid-state component includes a solid-state component, a magnetostrictive element, or a configuration-memory element.

17. The contact detection sensor as claimed in claim 15, wherein the solid-state component includes a solid-state component, a magnetostrictive element, or a configuration-memory element.

* * * * *

UNITED STATES PATENT AND TRADEMARK OFFICE
CERTIFICATE OF CORRECTION

PATENT NO.    : 6,516,669 B2
DATED         : February 11, 2003
INVENTOR(S)   : Matsuki et al.

It is certified that error appears in the above-identified patent and that said Letters Patent is hereby corrected as shown below:

<u>Title page,</u>
Item [57], ABSTRACT,
Please delete the ABSTRACT in its entirety and replace it with the following:

-- A stylus is mounted directly on a detector and the detector is mounted directly on a holder. Thus, a vibration-type contact detection sensor is formed in a state in which the holder and the stylus are placed out of contact with each other and the stylus and the detector are placed in contact with each other. Therefore, attenuation of vibration and state change of the stylus by the holder can be circumvented and vibration and state change of the stylus can be propagated directly to the detector, so that the detector can detect vibration and state change of the stylus with high sensitivity, and contact with a workpiece can be detected with high sensitivity. --.

<u>Column 5,</u>
Line 17, delete "$11000N/mm^2$" and insert -- $110000N/mm^2$ --.

Signed and Sealed this

Seventeenth Day of June, 2003

JAMES E. ROGAN
*Director of the United States Patent and Trademark Office*